(12) United States Patent
Bankston et al.

(10) Patent No.: US 7,577,661 B2
(45) Date of Patent: Aug. 18, 2009

(54) EXTENSIBLE AND AUTOMATICALLY REPLICATING SERVER FARM CONFIGURATION MANAGEMENT INFRASTRUCTURE

(75) Inventors: John Keith Bankston, Bothell, WA (US); Corey Michael Roussel, Redmond, WA (US); William David Taylor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 131 days.

(21) Appl. No.: 11/171,617

(22) Filed: Jun. 30, 2005

(65) Prior Publication Data

US 2007/0005662 A1      Jan. 4, 2007

(51) Int. Cl.
G06F 7/00 (2006.01)
G06F 17/30 (2006.01)

(52) U.S. Cl. .................... 707/9; 707/102; 709/202; 709/220

(58) Field of Classification Search .......... 707/1–10, 707/100–104.1, 200–206; 709/203, 217, 709/219, 202, 220
See application file for complete search history.

(56) References Cited

U.S. PATENT DOCUMENTS

| | | | |
|---|---|---|---|
| 5,838,918 A | 11/1998 | Prager et al. | 395/200.51 |
| 6,691,165 B1 | 2/2004 | Bruck | |
| 7,181,539 B1* | 2/2007 | Knight et al. | 709/248 |
| 7,287,090 B1* | 10/2007 | Berg | 709/238 |
| 2001/0042073 A1 | 11/2001 | Saether et al. | 707/203 |
| 2002/0078174 A1* | 6/2002 | Sim et al. | 709/219 |
| 2004/0010786 A1 | 1/2004 | Cool et al. | 717/170 |
| 2004/0025076 A1* | 2/2004 | Cabrera et al. | 714/2 |
| 2005/0015471 A1* | 1/2005 | Zhang et al. | 709/221 |

OTHER PUBLICATIONS

Burns et al., Efficient data distribution in a Web server farm, Jul-Aug. 2001, IEEE, vol. 5, 56-65.*
Desai et al., A log(n) multi-mode locking protocol for distributed systems, Apr. 22-26, 2003, IEEE, 8 pages.*
Chinese First Office Action dated May 8, 2009 cited in Application No. 200680019703.2.

* cited by examiner

*Primary Examiner*—Jean B Fleurantin
(74) *Attorney, Agent, or Firm*—Merchant & Gould

(57) ABSTRACT

An extensible and automatically replicating server farm configuration management infrastructure is provided. A centralized configuration database stores all configuration data for the server farm. New configuration data can be added to the configuration database by extending a configuration object model without knowing or changing the schema of the configuration database. A synchronization mechanism is provided for each server in the server farm to automatically keep configuration data in the server farm synchronized across multiple servers in the server farm.

14 Claims, 4 Drawing Sheets

EXTENSIBLE AND AUTOMATICALLY REPLICATING SERVER FARM CONFIGURATION MANAGEMENT INFRASTRUCTURE

BACKGROUND

Nowadays, the Internet is widely used to transfer applications to users using browsers. The Internet also is used for commerce on the Web in which individual customers and businesses use the Web to purchase various goods and services. In fact, some companies offer goods and services solely on the Web while others use the Web to extend their reach.

With respect to these commercial activities and others, businesses and other content providers employ servers to process requests from different users. Various architectures are employed in handling these requests. Often, distributed architectures in which a set of servers in a cluster ("server farm") are used to handle requests. In such a server farm system, the set of servers appears to a user as a single server. A load-balancing mechanism may be used to determine which server within the server farm will be used to handle various requests directed to the server farm.

Configuring and maintaining the various servers within a server farm has historically been a difficult task. This problem is exacerbated as the number of servers employed in a given server farm increases in number. In order to properly maintain servers within a server farm, the servers need to be updated from time to time. These updates include configuring data and services provided by the servers, ensuring certain settings of each of the servers are in sync with respect to each other, and maintaining near real-time knowledge of the various services and applications that exist on the servers of the server farm.

Unfortunately, current technologies that perform server management fail to provide a cohesive methodology for enabling systematic and comprehensive management of servers within a server farm. For example, conventionally, most applications store configuration data in files. Such an approach has several key problems. First, these configuration files need to be kept in sync among all servers running the applications. Technologies such as Microsoft's Application Server manage to keep the configuration files in sync across multiple servers by copying the configuration files among the servers. However, a lot of additional work is necessary to provide server-specific information when copying the configuration file to a server machine. Therefore, it is desirable to have a mechanism that centrally stores all configuration data for a server farm and makes configuration data for an application automatically available everywhere in a server farm.

In addition, when one application is built on the top of another application ("base application"), the application needs to be aware that the base application has its own file format and the application usually needs to store its settings in a separate file. Though technologies such as XML make file formats more easily extensible, such technologies require the base application to publish a schema and a mechanism to prevent different applications from extending that schema in incompatible ways. Furthermore, if the base application wishes to upgrade settings stored in XML, the base application needs to ensure that it does not incidentally alter the settings of other applications or settings upon which those applications depend. Similarly, the base application can never change the locations of the files that contain the settings of applications depending on the base application. Another popular design stores application settings in a registry on each machine. This design makes it virtually impossible to distribute settings across a server farm and can have an adverse impact on system resource usage. Therefore, it is desirable to provide a centralized, extensible mechanism for storing application settings that does not rely upon a fixed file format.

SUMMARY

The invention addresses the above-identified needs by providing an extensible and automatically replicating configuration management infrastructure for a server farm. The infrastructure includes a configuration database that is the master copy of all configuration data in the server farm and where the configuration data are automatically persisted.

The configuration infrastructure further includes a configuration management object model that allows any third party to update configuration data in the configuration database without understanding or modifying the underlying configuration database schema. Preferably, the configuration management object model is the only way for interacting with the configuration database.

In accordance with another aspect of the invention, the configuration management infrastructure further includes a secured synchronization mechanism that ensures all servers in the server farm are updated with any configuration change in the configuration database. For example, each server in the server farm includes an agent, such as a timer service, that automatically queries the configuration database at a specific time interval such as every one minute. The agent then downloads any change in the configuration database to the server.

In summary, the invention provides a server farm configuration management infrastructure that is extensible and automatically replicating. As a result, configurations in a server farm can be synchronized automatically and configuration changes can be added to the centralized configuration database without a user knowing or changing the underlying configuration database schema.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The novel features believed characteristic of the invention of the invention are set forth in the appended claims. The invention itself, however, as well as the preferred mode of use, further objectives and advantages thereof, will best be understood by reference to the following detailed description of an illustrative embodiment when read in conjunction with the accompanying drawings, wherein:

DETAILED DESCRIPTION OF THE EXEMPLARY EMBODIMENTS

Figure 1:
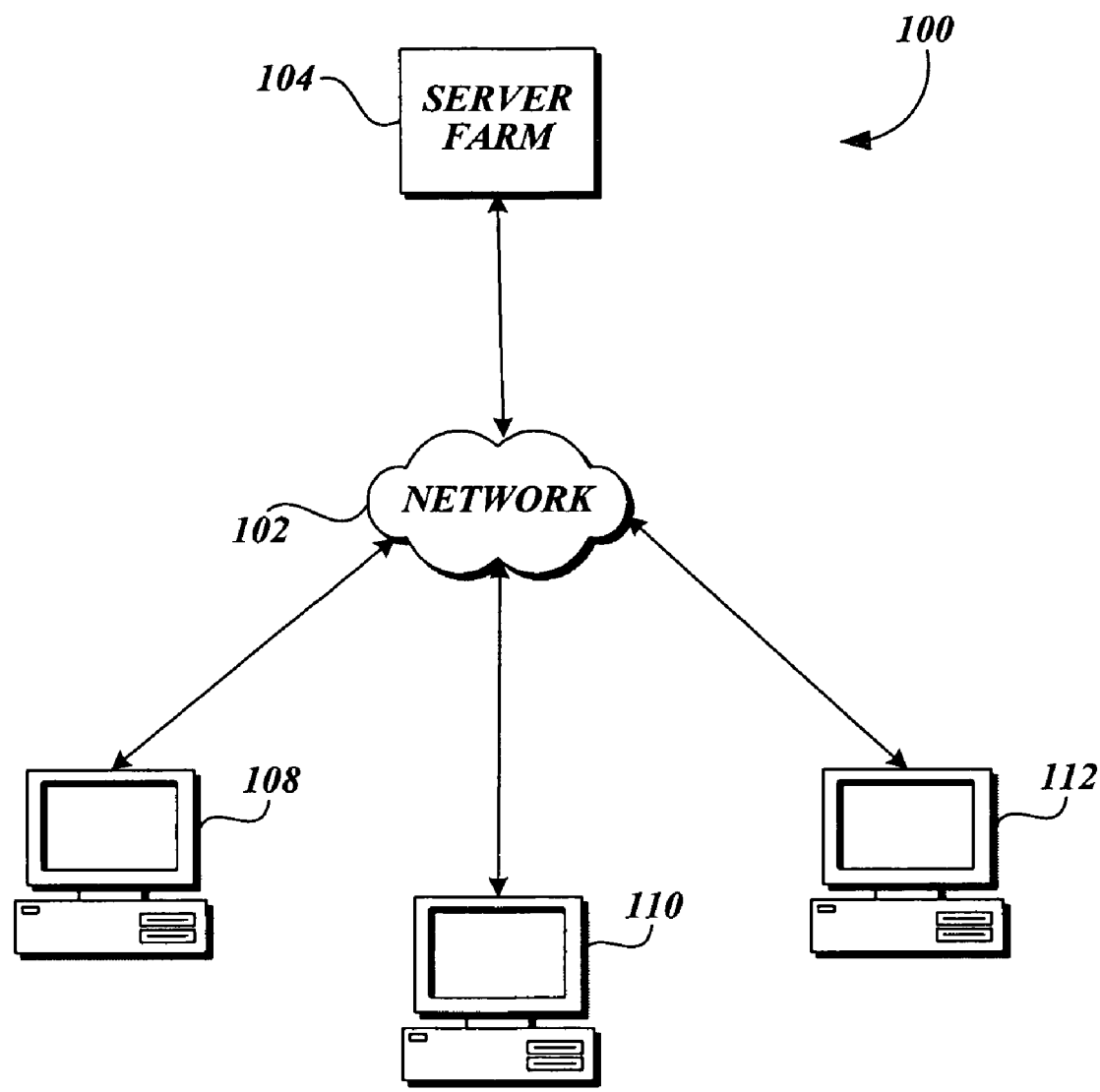
FIG. 1 illustrates a pictorial diagram illustrating an exemplary network of data processing systems in which aspects of the invention may be implemented.

FIG. 1 illustrates a pictorial representation of a network 100 of data processing systems in which an exemplary embodiment of the invention may be implemented. The network 100 of data processing systems includes a network 102, which is a medium used to provide communication links between various devices and computers connected together within the network 100 of data processing systems. The network 102 may include connections such as a wired or wireless communication link, fiber optic cables, and the like.

As shown in FIG. 1, the network 100 of data processing systems includes at least one server farm 104 and multiple clients 108-112, all of which are connected to the network 102. The server farm 104 is generally comprised of a set of servers that are presented as a single server or a "virtual" server for processing requests. The clients 108, 110, and 112 are clients to the server farm 104. These clients 108, 110, and 112 may be, for example, personal computers or network computers. Generally, the server farm 104 provides data, such as boot files, operating system images, and applications to the clients 108-112. The network 100 of data processing systems may include additional servers, clients, and other devices not shown.

In the depicted example, the network 100 of data processing systems is the Internet, where the network 102 represents a worldwide collection of networks and gateways that use a TCP/IP suite of protocols to communicate with one another. At the heart of the Internet is a backbone of high-speed data communication lines between major nodes or host computers. These nodes or host computers include thousands of commercial, government, education, and other computer systems that route data and messages. The network data processing system 100 may also be implemented as a number of different types of networks, such as, for example, an intranet, a local area net (LAN), or a wide area network (WAN). FIG. 1 is intended as an example, and not as an architectural limitation of the invention.

Figure 2:
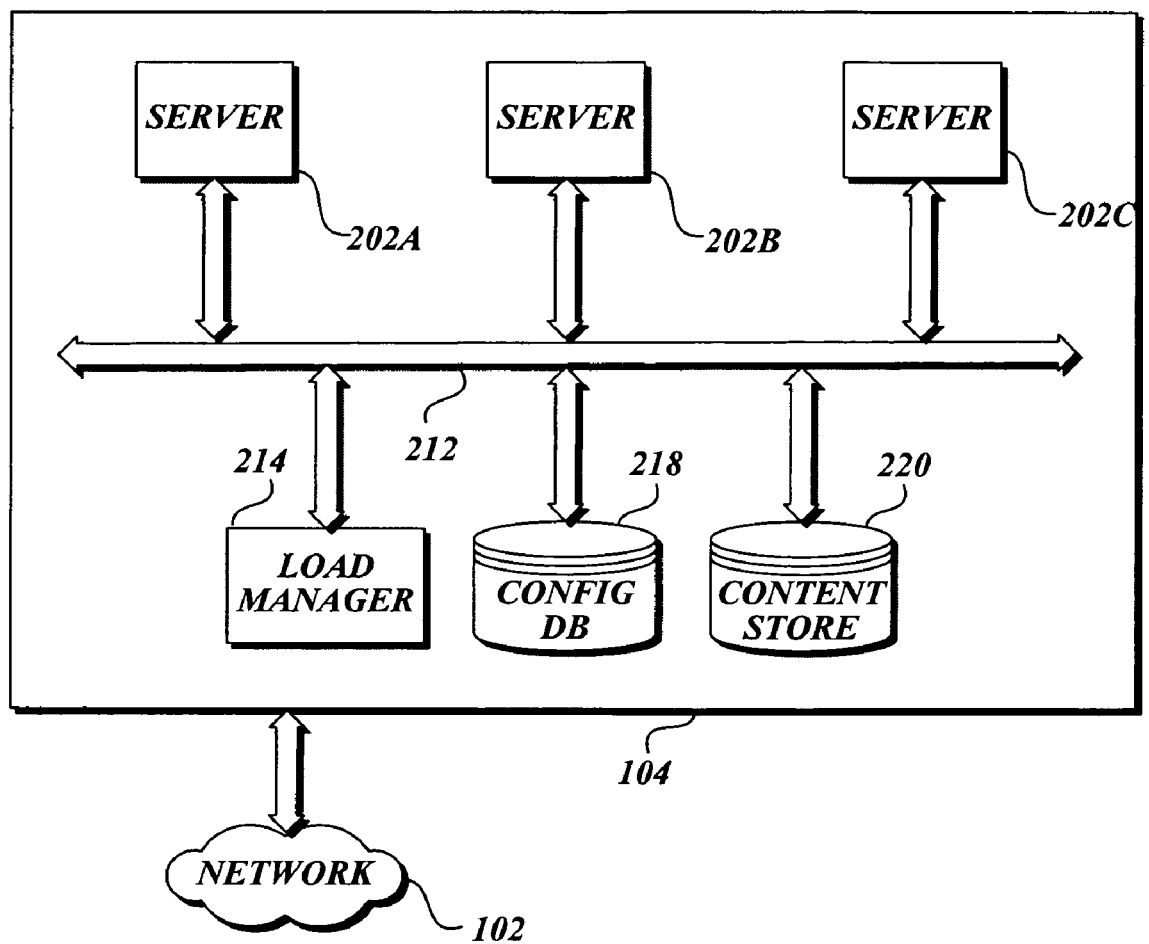
FIG. 2 illustrates a block diagram illustrating an exemplary server farm used in FIG. 1.

FIG. 2 is a block diagram of a server farm 104 in accordance with an exemplary embodiment of the invention. As shown in FIG. 2, the server farm 104 includes a plurality of servers such as servers 202A, 202B, 202C, which communicate with each other through a communication system 212. The communication system 212 is used to handle routing requests and responses directed towards the server farm 104. The communication system 212 may take various forms, including, for example, a bus, a network, a shared memory, or the like.

The server farm 104 may include a load manager 214 that is connected to the communication system 212 and that serves to receive requests directed to the server farm 104 from the network 102. The requests may include requests received from clients 108-112 (FIG. 1) and may include, for example, requests for Web pages, files, and other content. The load manager 214 operates to distribute the requests to servers 202A-202C for processing. Essentially, the load manager 214 operates to ensure that none of the servers 202A-202C of the server farm 104 is unnecessarily burdened by requests made of the server farm 104.

In embodiments of the invention, the server farm 104 includes a configuration database 218 that stores essentially all of the configuration data for the server farm 104. The configuration database 218 is operatively connected to the communication system 212 to allow configuration data to be sent to each of the servers 202A-202C in the server farm 104. The configuration database 218 is used to manage configuration settings of each of the servers 202A-202C. The configuration database 218 therefore, acts as a central repository for any configuration settings that must be changed and/or added to the various servers 202A-202C of the server farm 104. Providing the configuration database 218 eliminates the necessity of having to manually update and/or add configuration settings of the servers 202A-202C. Besides storing information about a server topology, the configuration database 218 may also store application-specific settings such as security policies, antivirus definitions, language settings, etc. In embodiments of the invention, the configuration database 218 is the master copy of all configuration data in the server farm 104 thus enables the same information to be available across a set of servers in the server farm 104.

The server farm 104 may also include at least one content store 220. Similar to the other operational elements of the server farm 104, the content store 220 is operationally connected to the communication system 212 in order to allow information stored within the content store 220 to be distributed to the various components of the server farm 104. In exemplary embodiments of the invention, the content in the content store 220 are data for the servers in the server farm 104. Such data includes documents, data items, discussions, tasks, etc. The content store 220 operates in conjunction with the configuration database 218 to provide content specifically related to a given configuration change of one or more of the servers 202A-202C. In exemplary embodiments of the invention, the content store 220 does not interface with the configuration database 218. The configuration database 218 contains a map of which content database stores data for a server. As a result, it is not necessary to query each content store 220 in the server farm 104 to see if the content store contains the content for a particular server in the server farm 104.

In exemplary embodiments of the invention, the server farm 104 is arbitrarily extensible. This includes that the server farm 104 can be arbitrarily extended with multiple servers other than the servers 202A-202C. In addition, the server farm 104 may include multiple content stores 220 to store data for the multiple servers.

Figure 3:
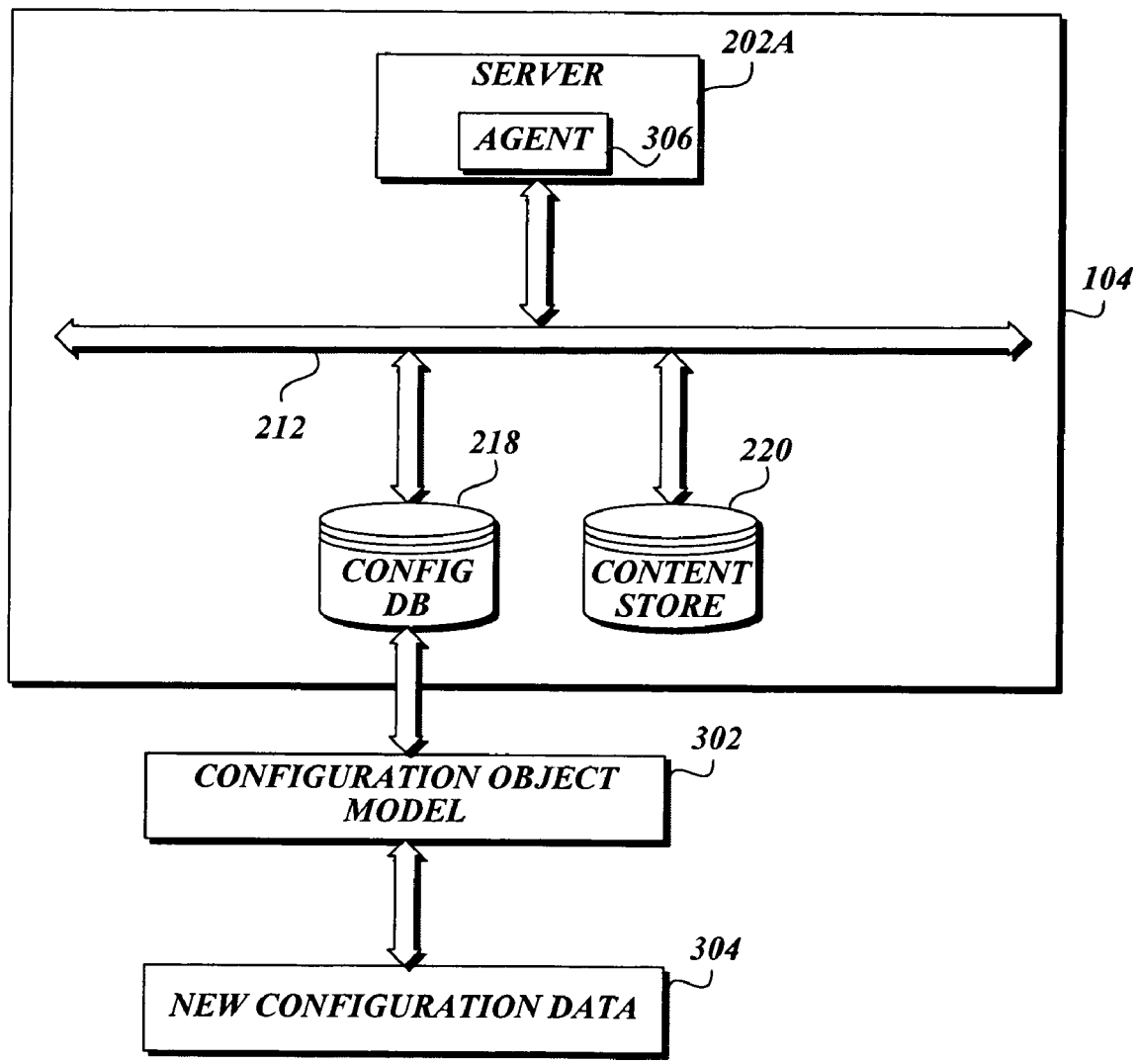
FIG. 3 is a block diagram illustrating another exemplary server farm.

In particular, as shown in FIG. 3 exemplary embodiments of the invention enable arbitrary extension of the server farm 104 by providing a configuration object model 302 to add configuration data or manage configuration data in the configuration database 218. For example, as shown in FIG. 3, the configuration object model 302 allows a user to add new configuration data 304 to the configuration database 218. The configuration object model allows a user to expand or update configuration data for the server farm 104 without requiring the user to understand the schema of the configuration database 218 and without requiring the user to edit the configuration database 218. In an exemplary embodiment of the invention, a .Net object-based class is provided for the configuration object model 302. A user can extend the base class with specific configuration data. Such data is then integrated into the configuration database 218. As a result, a user only needs to go through the configuration object model 302 to interact with the configuration database 218 and add varying types of data into the configuration database 218 without understanding or modifying the schema of the configuration database 218. In an exemplary embodiment of the invention, objects containing configuration information for an application is either derived from or contained by a base class, named, for example, as SPPersistedObject. When updated, this class will serialize into XML all fields marked with the "persisted" attribute, and write the XML blob into the configuration database 218. The base class contains code to serialize all of its members that are base types, other SPPersistedObjects, or collections of one of the two. Such design allows new objects containing configuration data for applications to be added to the configuration database 218 as needed by an application that is part of the server farm 104.

Embodiments of the invention also provide a synchronization mechanism that automatically replicates any change in the configuration database 218 to servers in the server farm 104. In an exemplary embodiment of the invention, each of the servers 202A-202C of the server farm 104 includes an agent. This agent may be operatively stored in a local memory and/or hard disk in the server. As shown in FIG. 3, the server 202A contains an agent 306. Operationally, the agent 306 operates to determine whether modifications have occurred to configuration data in the configuration database 218. Preferably, the agent 306 operates on a timed basis which allows for periodic polling of the configuration database 218 to determine if changes and/or additions have occurred within the configuration database 218.

In an exemplary embodiment of the invention, the agent 306 is a thread in a Microsoft Windows service such as the SharePoint Timer. The agent 306 connects to the configuration database 218 at least once every minute and runs a query. The query uses the timestamp of the newest configuration record on the server 202A. The query uses the timestamp as an input to query the configuration database 218 and returns any configuration records in the configuration database 218 that have been created, changed, or deleted since the time recorded by the timestamp.

In an exemplary embodiment of the invention, the agent 306 does not directly interface with the content store 220. However, the agent 306 helps to propagate information necessary for other processes on the servers in the server farm 104 to connect to the content store 220. For example, in an exemplary embodiment of the invention, if a new content database is added to the server farm 104 to accommodate additional usage, the agent 306 would distribute the connection string for the new content database to each of the servers in the server farm 104 to register the new content database in a list on the server that identifies available content databases in the server farm 104. As a result, other processes on the servers in the server farm 104 can use the new content database for content storage. In embodiments of the invention, the agent 306 executes in a loop to query the configuration database 218 at least every minute, to run the query, and to propagate information concerning any configuration record changes.

Figure 4:
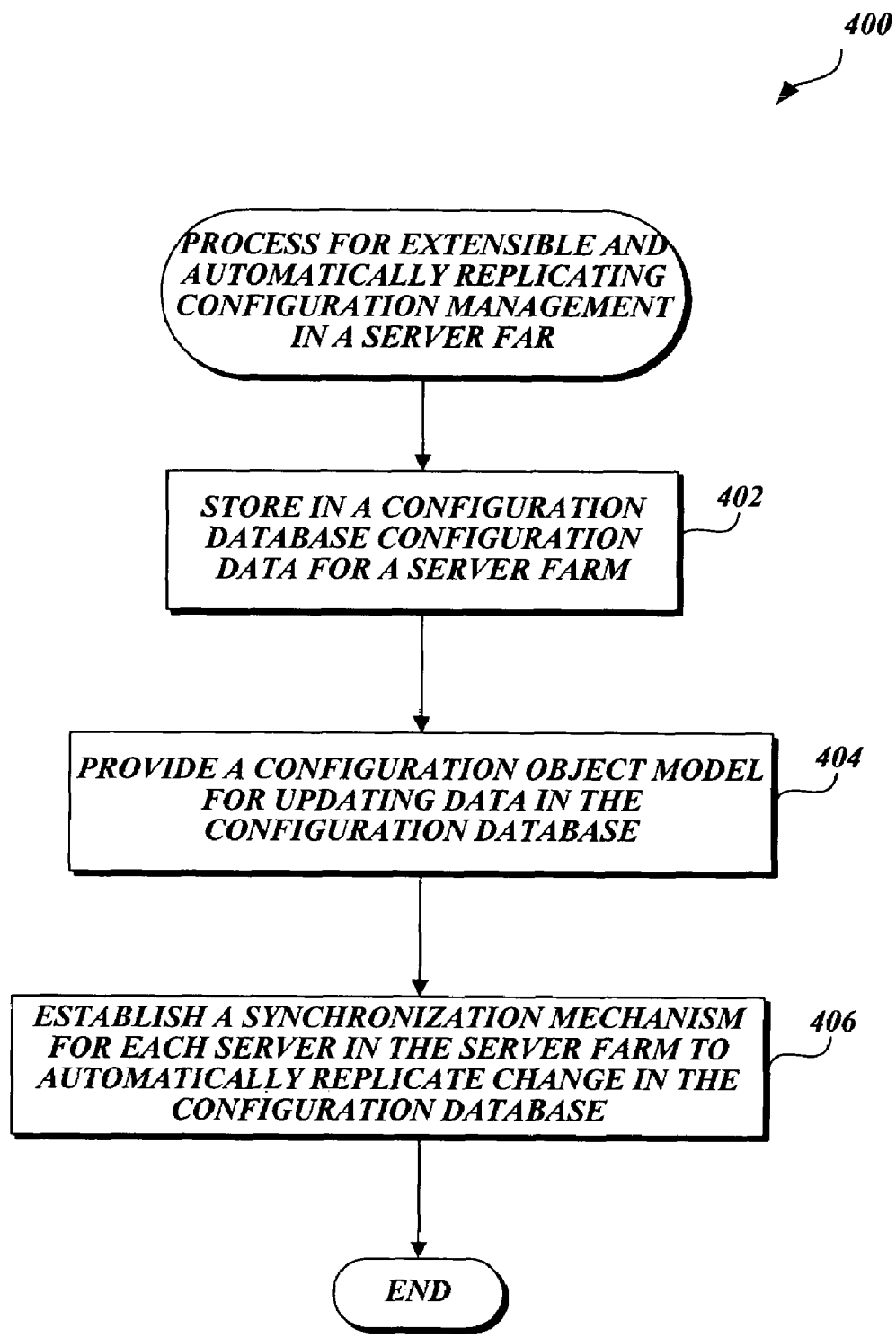
FIG. 4 is a flow diagram illustrating an exemplary process for extensible and automatically replicating configuration management of a server farm.

Embodiments of the invention thus provide a method for extensible and automatically replicating configuration management for a server farm such as the server farm 104. FIG. 4 illustrates an exemplary process 400 for extensible and automatically replicating configuration management for a server farm including at least one server. As shown in FIG. 4, the process 400 stores all configuration data concerning a server farm into a configuration database such as the configuration database 218. See block 402. The configuration data may include server topology, application-specific settings such as security policies, antivirus definitions, language settings, etc. The process 400 also builds a configuration object model such as the configuration object model 302. See block 404. For example, the configuration object model is a base class that can be extended by sub-classing or instantiating to provide new configuration data for the configuration database, without knowing or using the schema of the configuration database. The process 400 also establishes a synchronization mechanism such as the agent 306 in each server in the server farm. See block 406. In an exemplary embodiment of the invention, the synchronization mechanism queries the configuration database periodically, and updates any change in the configuration database since the last query. The process 400 then terminates. The order of description of the operations in the process 400 should not be construed to as imply that these operations are necessarily performed in the order they are presented, or even order dependent.

While the exemplary embodiments of the present invention have been illustrated and described, it will be appreciated that various changes can be made therein without departing from the spirit and scope of the present invention.

The embodiments of the invention in which an exclusive property or privilege is claimed are defined as follows:

1. A user-configurable, synchronized server farm, the server farm comprising:
    a communication system comprising at least one of: a bus, a network, and a shared memory;
    a configuration database, included in computer-readable memory and connected to the communication system, operative to store configuration data for the server farm and to send the configuration data to each server of the server farm in response to a request, the configuration data comprising server configuration settings and application-specific settings;
    a configuration data object model coupled to the configuration database for updating the configuration data stored in the configuration database in accordance with user input; and
    a plurality of servers connected through the communication system to the configuration database for receiving the configuration data stored in the configuration database, each server including a synchronization mechanism comprising a timer service for automatically updating the server with any change in the configuration data stored in the configuration database, the synchronization mechanism including an agent stored in the server, the agent periodically connecting to and querying the configuration database and downloading the change in the configuration data to the server, the plurality of servers forming the server farm.

2. The server farm of claim 1, wherein the application-specific settings include security policies, antivirus definitions, and language settings.

3. The server farm of claim 2, wherein the configuration data object model allows a user to add data to the configuration database without modifying a schema of the configuration database.

4. The server farm of claim 1, further comprising at least one content store that stores data for at least one server in the server farm.

5. The server farm of claim 4, wherein the synchronization mechanism propagates information about the content store to the server.

6. The server farm of claim 1, further comprising a load manager for distributing among servers in the server farm requests made to the server farm.

7. An extensible system for automatically replicating the configuration of the servers of a server farm, comprising:
    a communication system comprising at least one of: a bus, a network, and a shared memory;
    a configuration database, included in computer-readable memory and connected to the communication system, operative to store configuration data for the server farm and to send the configuration data to each server of the server farm in response to a request, the configuration data comprising server configuration settings and application-specific settings, the configuration database including a schema of the configuration database;
    a plurality of servers connected through the communication system to the configuration database for receiving the configuration data stored in the configuration database, the plurality of servers forming a server farm;

a configuration object model coupled to the configuration database that is extendable for updating the configuration data in the configuration database without using the schema of the configuration database; and a synchronization mechanism included in each server in the server farm for automatically updating the server with any change in the configuration data, the synchronization mechanism including an agent stored in the server, the agent periodically connecting to and querying the configuration database and downloading the change in the configuration data to the server.

8. The system of claim 7, wherein the synchronization mechanism is a timer service.

9. The system of claim 7, further comprising at least one content store that stores data for the plurality of servers.

10. The system of claim 9, wherein the synchronization mechanism propagates information about the content store to the plurality of servers.

11. The system of claim 7, further comprising a load manager for distributing among servers in the server farm requests made to the server farm.

12. The system of claim 7, further comprising at least one client device that sends at least one request to the server farm.

13. An extensible method for automatically replicating the configuration of the servers of a server farm containing a plurality of servers, comprising:

storing in a configuration database, included in a computer-readable memory and operative to store configuration data for the server farm and to send the configuration data to each server of the server farm in response to a request, configuration data for the server farm, the configuration data comprising server configuration settings and application-specific settings, the configuration database having a schema;

providing a configuration object model that can be extended to update the configuration data in the configuration database without using the schema of the configuration database; and establishing a synchronization mechanism for each server in the server farm for automatically updating the server with any change in the configuration data stored in the configuration database, the synchronization mechanism including an agent stored in the server, the agent periodically connecting to and querying the configuration database and downloading the change in the configuration data to the server.

14. A user-configurable, synchronized server farm, the server farm comprising:

a communication system comprising at least one of: a bus, a network, and a shared memory;

a configuration database, included in computer-readable memory and connected to the communication system, operative to store configuration data for the server farm and to send the configuration data to each server of the server farm in response to a request, the configuration data comprising server configuration settings and application-specific settings;

a configuration data object model coupled to the configuration database for updating the configuration data stored in the configuration database in accordance with user input; and a plurality of servers connected through the communication system to the configuration database for receiving the configuration data stored in the configuration database, each server including a synchronization mechanism for automatically updating the server with any change in the configuration data stored in the configuration database, the synchronization mechanism including an agent stored in the server, the agent periodically connecting to and querying the configuration database and downloading the change in the configuration data to the server, the plurality of servers forming the server farm wherein the configuration data object model allows a user to add data to the configuration database without modifying a schema of the configuration database.

* * * * *